US012227993B1

(12) United States Patent
Nelson, Jr.

(10) Patent No.: US 12,227,993 B1
(45) Date of Patent: Feb. 18, 2025

(54) TOOL CADDY SYSTEM FOR LADDERS

(71) Applicant: Martin Elmer Nelson, Jr., Olney, MD (US)

(72) Inventor: Martin Elmer Nelson, Jr., Olney, MD (US)

( * ) Notice: Subject to any disclaimer, the term of this patent is extended or adjusted under 35 U.S.C. 154(b) by 0 days.

(21) Appl. No.: 18/642,218

(22) Filed: Apr. 22, 2024

(51) Int. Cl.
*E06C 7/14* (2006.01)
*B25H 3/02* (2006.01)

(52) U.S. Cl.
CPC *E06C 7/14* (2013.01); *B25H 3/02* (2013.01)

(58) Field of Classification Search
CPC .............. E06C 7/14; E06C 7/165; B25H 3/02
USPC ................. 248/210–211, 238, 911; 182/129, 182/121–122, 119; 220/478
See application file for complete search history.

(56) References Cited

U.S. PATENT DOCUMENTS

| | | | | |
|---|---|---|---|---|
| 2,674,427 A | | 4/1954 | Woodward et al. | |
| 2,759,620 A | * | 8/1956 | Pharris | B44D 3/126 217/60 B |
| 2,883,134 A | | 4/1959 | O'Halloran | |
| 3,052,442 A | * | 9/1962 | Rankin, Jr. | E06C 7/14 248/210 |
| 3,734,439 A | * | 5/1973 | Wintz | A47G 23/0241 248/230.8 |
| 3,979,097 A | * | 9/1976 | Balne | E06C 7/14 D25/68 |
| 3,987,993 A | * | 10/1976 | Hopkins | E06C 7/14 248/210 |
| 4,036,463 A | * | 7/1977 | Hopkins | B44D 3/123 248/210 |
| 4,222,541 A | | 9/1980 | Cillis | |
| 4,386,753 A | | 6/1983 | Smith | |
| 4,424,949 A | | 1/1984 | Kimmett et al. | |
| 4,515,242 A | | 5/1985 | Lachance | |
| 4,534,528 A | * | 8/1985 | Rousseau | E06C 7/14 248/210 |

(Continued)

FOREIGN PATENT DOCUMENTS

GB 2177443 A 8/1988

OTHER PUBLICATIONS

"Ladder Friend" published on Oct. 11, 2023 at https://www.jokari.com/products/easy-up-ladder-friend.

*Primary Examiner* — Ingrid M Weinhold
(74) *Attorney, Agent, or Firm* — Nath, Goldberg & Meyer; Joshua B. Goldberg

(57) ABSTRACT

A tool caddy system for ladders is provided including a rung attachment member coupled to one or more rungs of a ladder. A support arm connected to the rung attachment member includes a mating interface for engagement with a supply holder. The supply holder includes a corresponding mating interface for interchangeable attachment to the support arm. The rung attachment member may include one or more hooks or alternatively one or more interchangeable rung couplers such as spring clips or elastic clamps. The support arm may include holes corresponding to various positions for joining the support arm in relation to the rung attachment member through insertion of an attachment pin. The mating interface between the support arm and supply holder may include a female slot and a corresponding male connector in which an attachment pin is inserted. The female slot may be any shape such as circular or T-shaped.

16 Claims, 21 Drawing Sheets

(56) References Cited

U.S. PATENT DOCUMENTS

| | | | | | |
|---|---|---|---|---|---|
| 4,624,430 | A * | 11/1986 | Ehmke | E06C 7/14 | |
| | | | | 248/312.1 | |
| 4,979,710 | A * | 12/1990 | Baldwin | E06C 7/14 | |
| | | | | 248/210 | |
| 4,991,808 | A | 2/1991 | Lachance | | |
| 5,079,795 | A | 1/1992 | Schmid | | |
| 5,099,952 | A | 3/1992 | Farrell | | |
| 5,461,752 | A * | 10/1995 | Lemon | B44D 3/12 | |
| | | | | D32/53.1 | |
| 6,148,958 | A | 11/2000 | Ahl | | |
| 6,513,626 | B2 * | 2/2003 | MacSweeney | E06C 7/14 | |
| | | | | 403/374.1 | |
| 7,032,711 | B1 | 4/2006 | Katz et al. | | |
| 7,270,307 | B2 | 9/2007 | Zodnik | | |
| 8,210,313 | B2 | 7/2012 | Astor | | |
| 8,453,796 | B2 | 6/2013 | Astor et al. | | |
| 9,121,423 | B2 * | 9/2015 | Sharpe | F16M 13/022 | |
| 9,714,542 | B1 | 7/2017 | Harcz | | |
| 9,850,706 | B2 | 12/2017 | Astor et al. | | |
| 10,119,332 | B1 * | 11/2018 | Schellens | E06C 7/14 | |
| 2009/0250294 | A1 * | 10/2009 | Byers | E06C 7/14 | |
| | | | | 248/210 | |
| 2011/0079467 | A1 * | 4/2011 | Mares | E06C 7/14 | |
| | | | | 182/129 | |
| 2011/0203873 | A1 * | 8/2011 | Perry | E06C 7/14 | |
| | | | | 182/129 | |
| 2014/0231605 | A1 * | 8/2014 | Sharpe | F16B 2/065 | |
| | | | | 248/228.6 | |

* cited by examiner

TOOL CADDY SYSTEM FOR LADDERS

BACKGROUND

Field

The disclosure of the present patent application relates to tool carriers, and particularly to a tool caddy system for ladders that may attach to either side of the ladder and support a variety of tool supply holders.

Description of Related Art

In various industries and professions, ladders are commonly used to reach elevated work areas. Workers often need to carry tools and materials up the ladder to perform their tasks. However, managing these tools and materials while on a ladder can be challenging and potentially dangerous. Tools can be dropped, causing injury to people below or damage to the tools themselves. Furthermore, workers may need to climb up and down the ladder multiple times to retrieve different tools, which can be time-consuming and increase the risk of falls. Therefore, there is a need for a system that can safely and conveniently hold tools and materials on a ladder.

Furthermore, having a supply holder for workers that can attach to either a left or right siderail of a ladder would be beneficial for reasons of convenience, safety, and efficiency. Workers often encounter diverse working conditions and spatial constraints. A supply holder that can attach to either side of a ladder would allow workers to position their supplies according to their preference or the specific requirements of the task at hand. This adaptability ensures that workers can efficiently access tools and materials without being hindered by limitations imposed by fixed-sided holders.

Previous attempts to provide supply holders for support on a ladder have been made. Prior attempts are often either only suited for attachment to one side of a ladder or for carrying a particular type of supply. However, a variety of supplies may be necessary depending on the type of work being performed. If a worker on a ladder is performing construction, some possible tools may include hammers, screwdrivers, wrenches, wire cutters, pliers whereas if a worker is performing cleaning the necessary supplies may include a bucket of cleaning solution, squeegee, sponges, towels, spray bottles and the like. Depending on the needed supplies of a particular task, it would be advantageous to attach a suitable supply container to a preferred side of a ladder, depending on the dominant hand of a worker and/or the spatial constraints of the work being performed. Thus, a tool caddy system for ladders solving the aforementioned problems is desired.

SUMMARY OF THE INVENTION

A tool caddy system for ladders is provided including a rung attachment member removably coupled to one or more rungs of a ladder. A support arm is pivotally and adjustably connected to the rung attachment member and includes a mating interface for engagement with a supply holder. The supply holder includes a corresponding mating interface for interchangeable attachment to the support arm. The rung attachment member may include a top plate and a side plate positioned orthogonally to the top plate, the side plate including one or more hooks formed therein. The side plate of the rung attachment member may include two hooks or four hooks formed therein.

In an embodiment, the rung attachment member includes a top plate and a pair of side plates positioned orthogonally to the top plate, each side plate including one or more hooks formed therein. The rung attachment member may include a divider plate extending from the top plate between the pair of side plates.

In another embodiment, the rung attachment member includes a top plate, a side plate positioned orthogonally to the top plate, and one or more interchangeable rung couplers extending from the top plate. The one or more interchangeable rung couplers may be adjustable to different lengths extending from the top plate. The interchangeable rung coupler may be, for example, a spring clip or an elastic clamp. The rung attachment member may include a handle extending from the top plate. The handle may be integrally formed with the rung attachment member. Alternatively, the handle may be separate and removably attachable.

The support arm of the tool caddy system may include a plurality of holes corresponding to various positions for joining the support arm in relation to the rung attachment member through insertion of an attachment pin. The support arm may include a handle formed therein and a lower flange in which the mating interface for the supply holder is formed. The mating interface between the support arm and supply holder may include a female slot and a corresponding male connector. The female slot and corresponding male connector may each include a hole in which an attachment pin is inserted. The female slot may be any shape such as circular or T-shaped.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
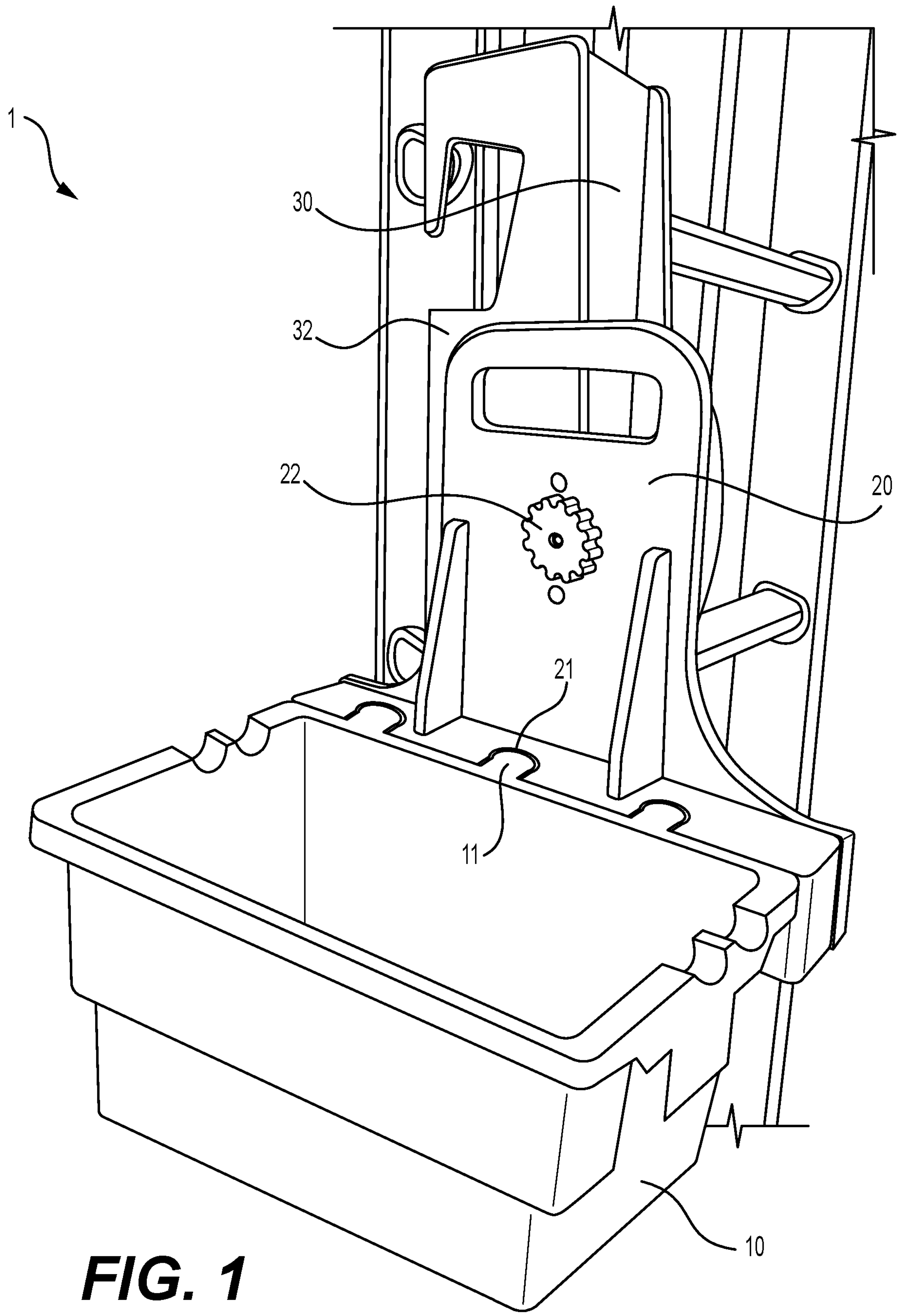
FIG. 1 is an environmental perspective view of a ladder caddy system.

Referring to FIG. 1, a tool caddy system 1 for ladders is provided. The tool caddy system 1 includes a supply holder 10 having a mating interface 11 for interchangeable attachment to a support arm 20. The support arm 20 includes a corresponding mating interface 21 for interchangeable attachment of the supply holder 10. The support arm 20 further includes means 22 for attaching and detaching to a side plate 32 of a rung attachment member 30. In a non-limiting example, means 22 for attachment between support arm 20 and rung attachment member 30 is a threaded rotatable pin with a knob as shown. However, other attachment means between the support arm 20 and rung attachment member 30 may be provided such as a snap-fit connection, a hook connection, a sliding connection, a straight pin, and the like.

Figure 2A:
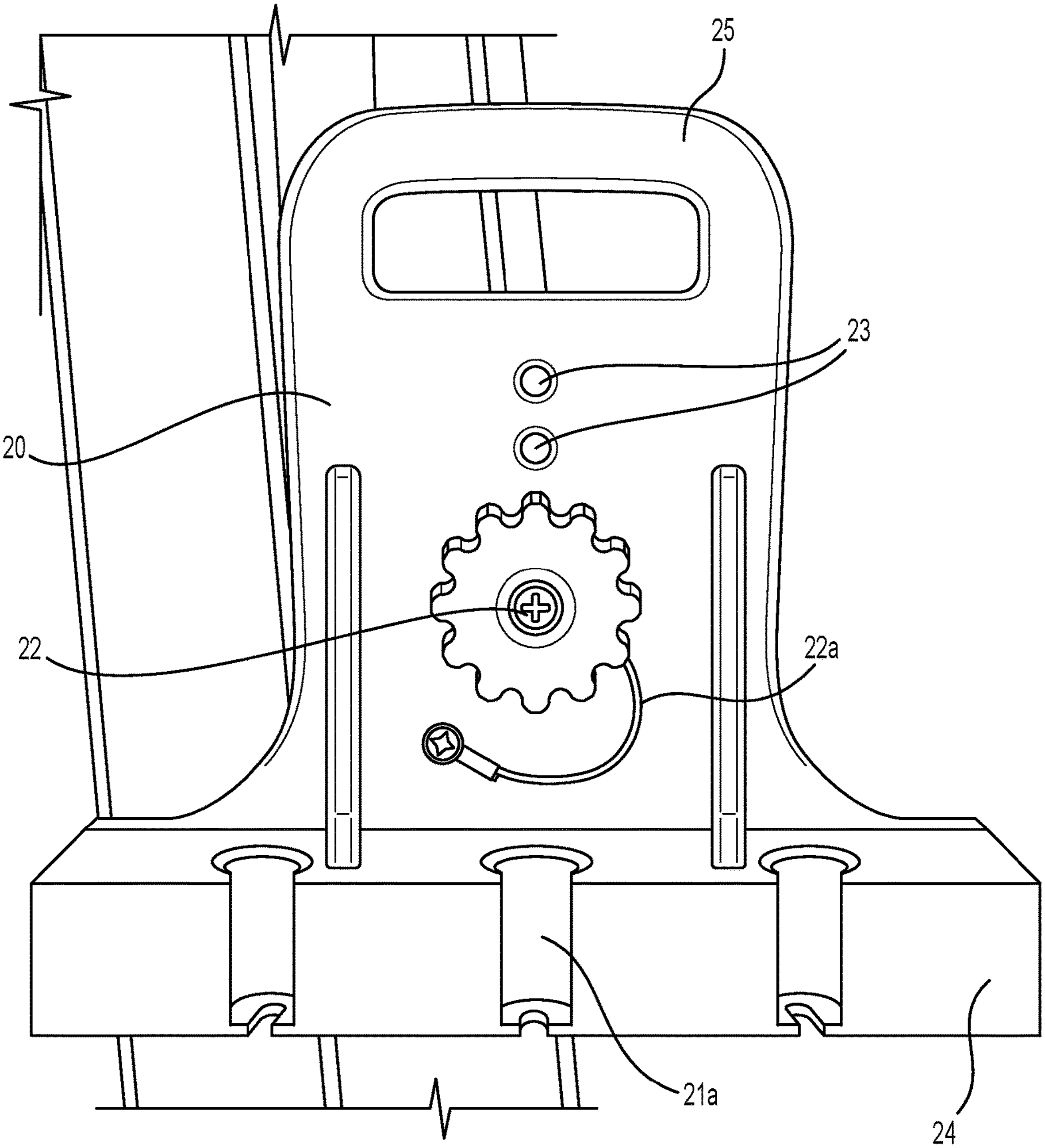
FIG. 2A is an environmental front view of a support arm of a ladder caddy system formed with round slots.
Figure 2B:
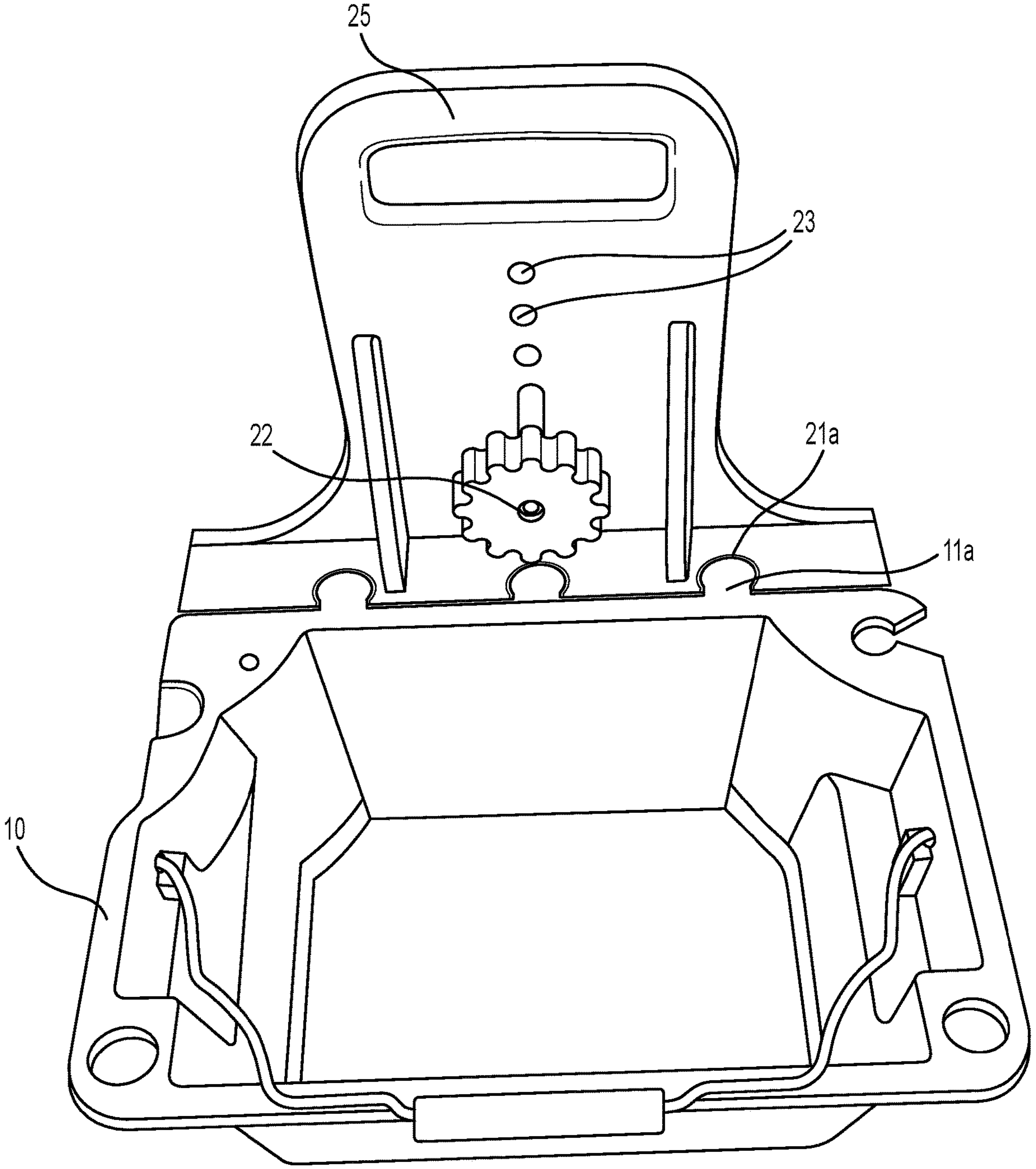
FIG. 2B is an elevated perspective view of a support arm and supply holder of a ladder caddy system.
Figure 2C:
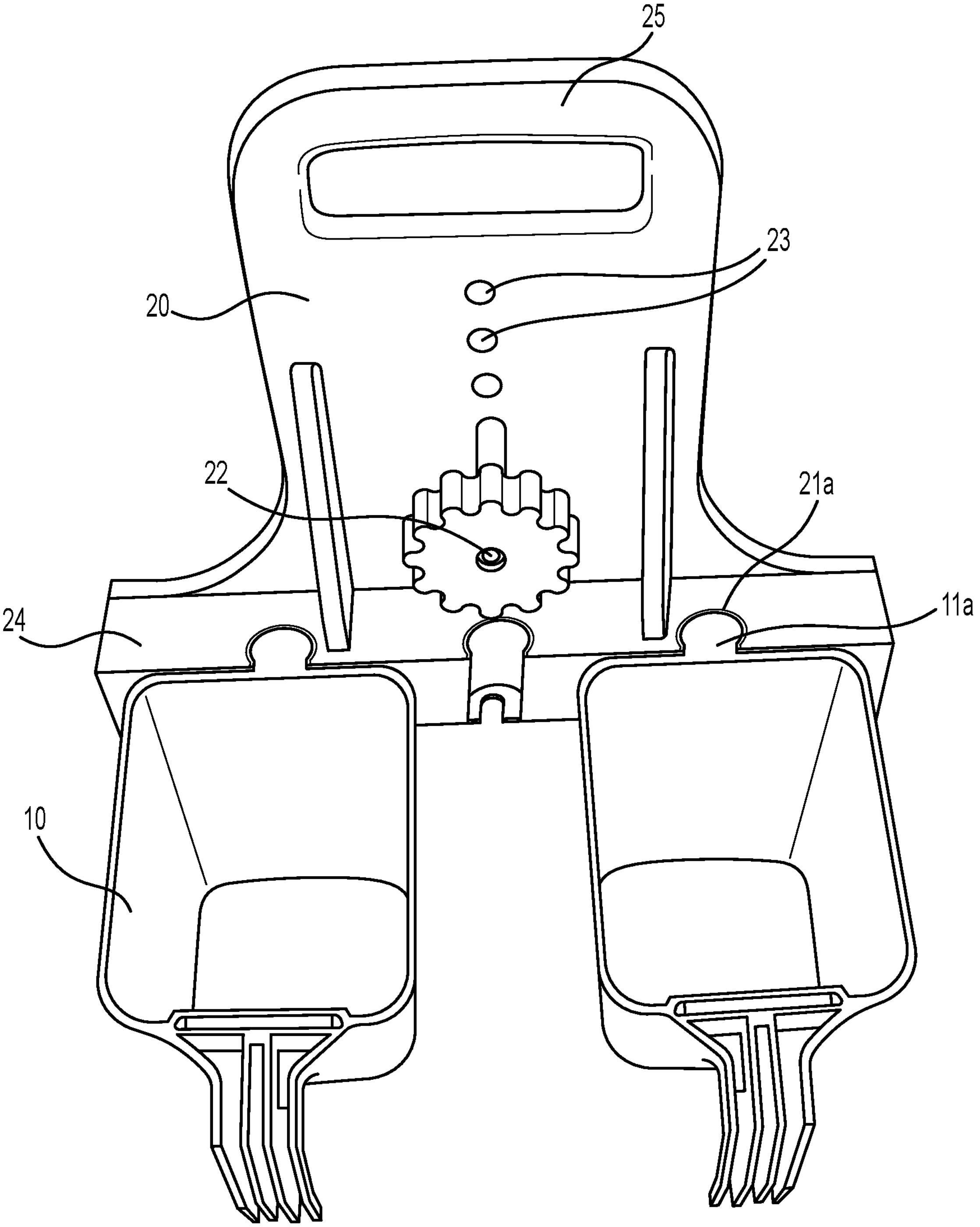
FIG. 2C is an elevated perspective view of a support arm and supply holders of a ladder caddy system.
Figure 2D:
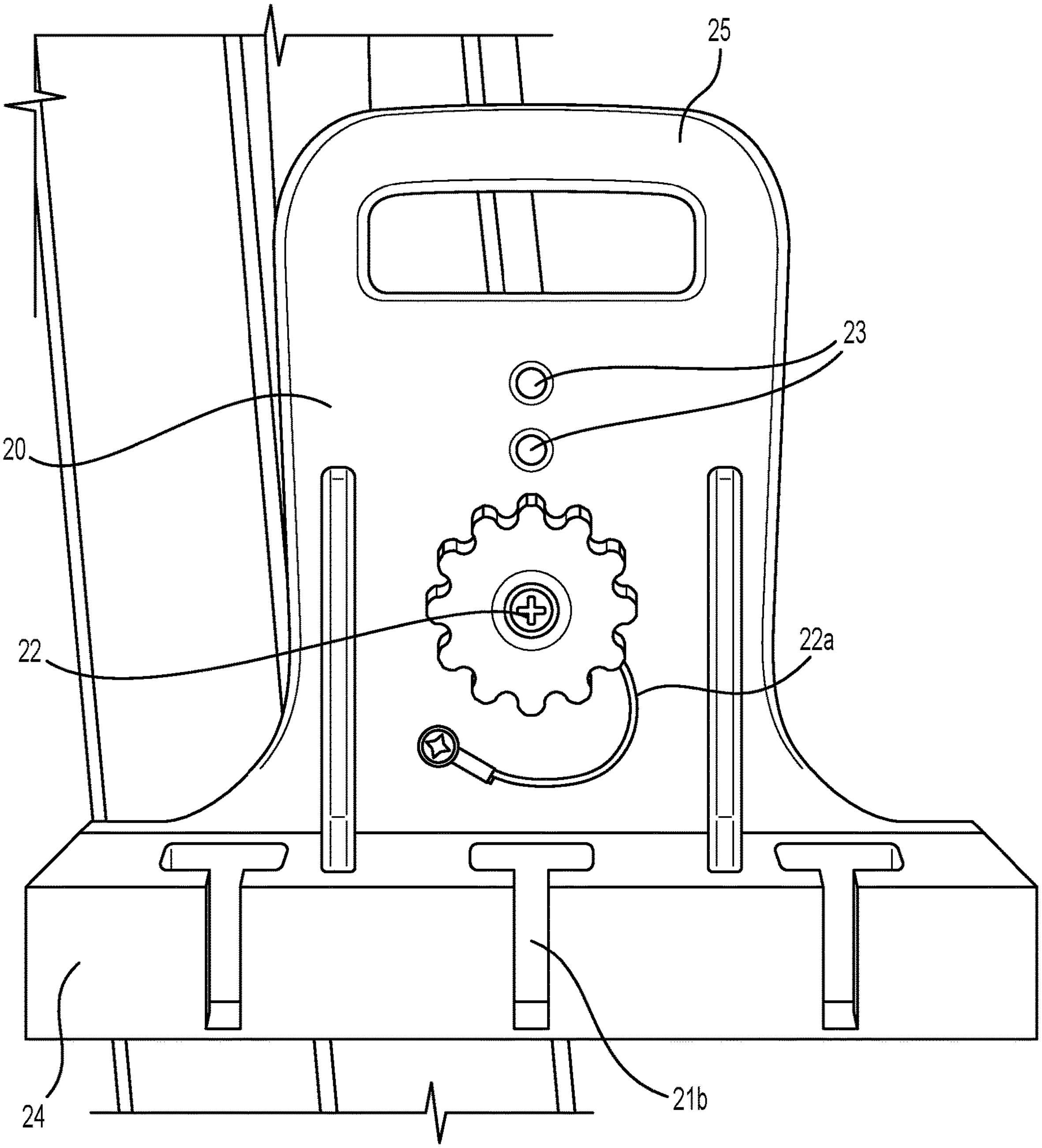
FIG. 2D is an environmental front view of a support arm of a ladder caddy system formed with T-shaped slots.
Figure 2E:
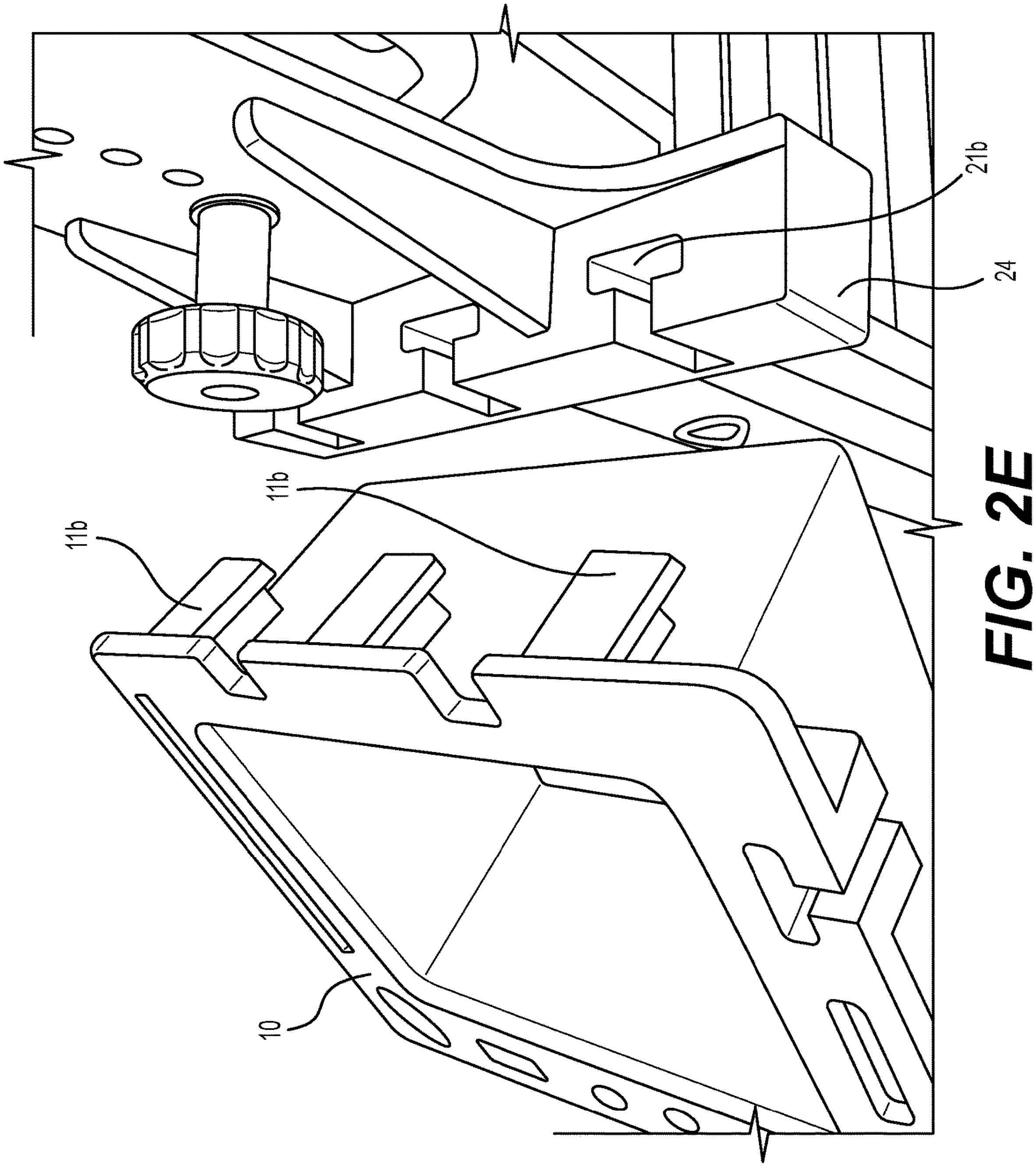
FIG. 2E is an environmental perspective view of a supply holder and support arm of a ladder caddy system formed with T-shaped mating interfaces.

Referring to FIG. 1 and FIGS. 2A-E, the support arm 20 may include a handle 25 formed therein and a plurality of holes 23 which correspond to various positions in which the support arm 20 may be joined in relation to the rung attachment member 30 by insertion of pin 22. A retaining cable **22*a* may be provided for securing pin 22 to support arm 20. The support arm 20 may include a lower flange 24 in which the mating interface 21 for the supply holder is formed. The support arm may include at least one female receptacle such as round slots 21*a* in the lower flange 24 and the supply holder 10 may include at least one corresponding male connector, such as round pegs 11*a* for interchangeable attachment to the female receptacle, as shown in FIGS. 2B-2C. In a non-limiting embodiment shown in FIG. 2B, the support arm 20 may include at least three female receptacles in the lower flange and the supply holder may include at least three corresponding male connectors for interchangeable attachment to the female receptacles of the support arm. In another non-limiting embodiment, shown in FIGS. 2D and 2E, support arm 20 may include T-shaped slots 21*b*, and supply holder 10 may include corresponding T-shaped members 11*b* for insertion in T-shaped slots 21*b***.

Figure 2F:
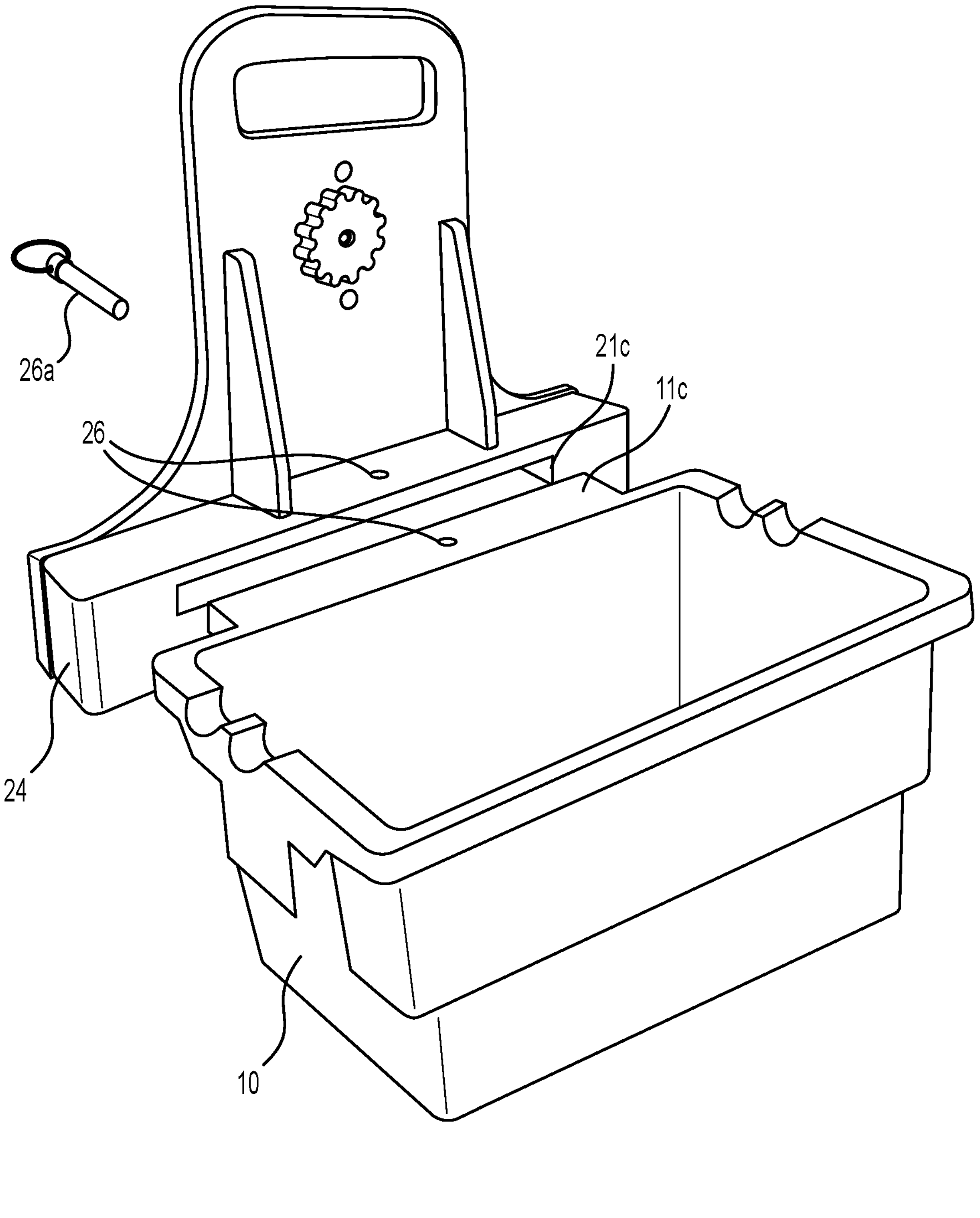
FIG. 2F is a perspective view of a supply holder and support arm of a ladder caddy system formed with a horizontal slot and pinhole mating interface.

In a further non-limiting embodiment, shown in FIG. 2F, female receptacle **21*c* and male connector 11*c* form a mating interface between support arm 20 and the supply holder 10 and may each include a hole 26 for insertion of an attachment pin 26*a*. Attachment pin 26*a* serving to further secure the connection between female receptacle 21*c* and the male connector 11*c*. It should be understood that the example mating interfaces shown in FIGS. 2A-F are non-limiting examples, and other shapes and configurations may be used for the mating interface between the supply holder 10 and support arm 20**. For example, the support arm may be fitted with male attachment members and the supply holder with corresponding female receptacles. Alternatively, a combination of male and female members/receptacles may be provided in alternative, corresponding arrangement on the support arm and supply holder.

Figure 3A:
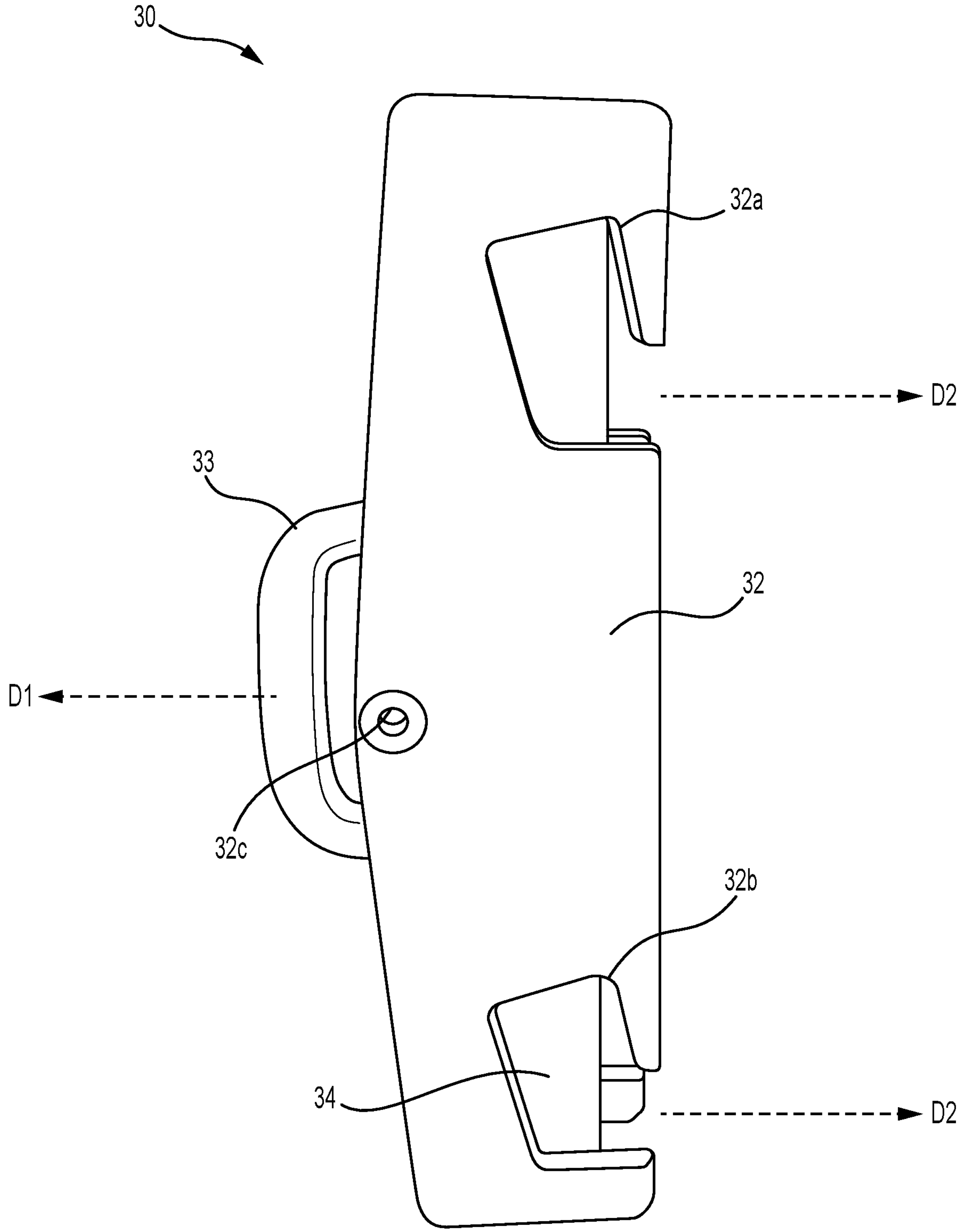
FIG. 3A is right side view of a rung attachment member of a ladder caddy system.
Figure 3B:
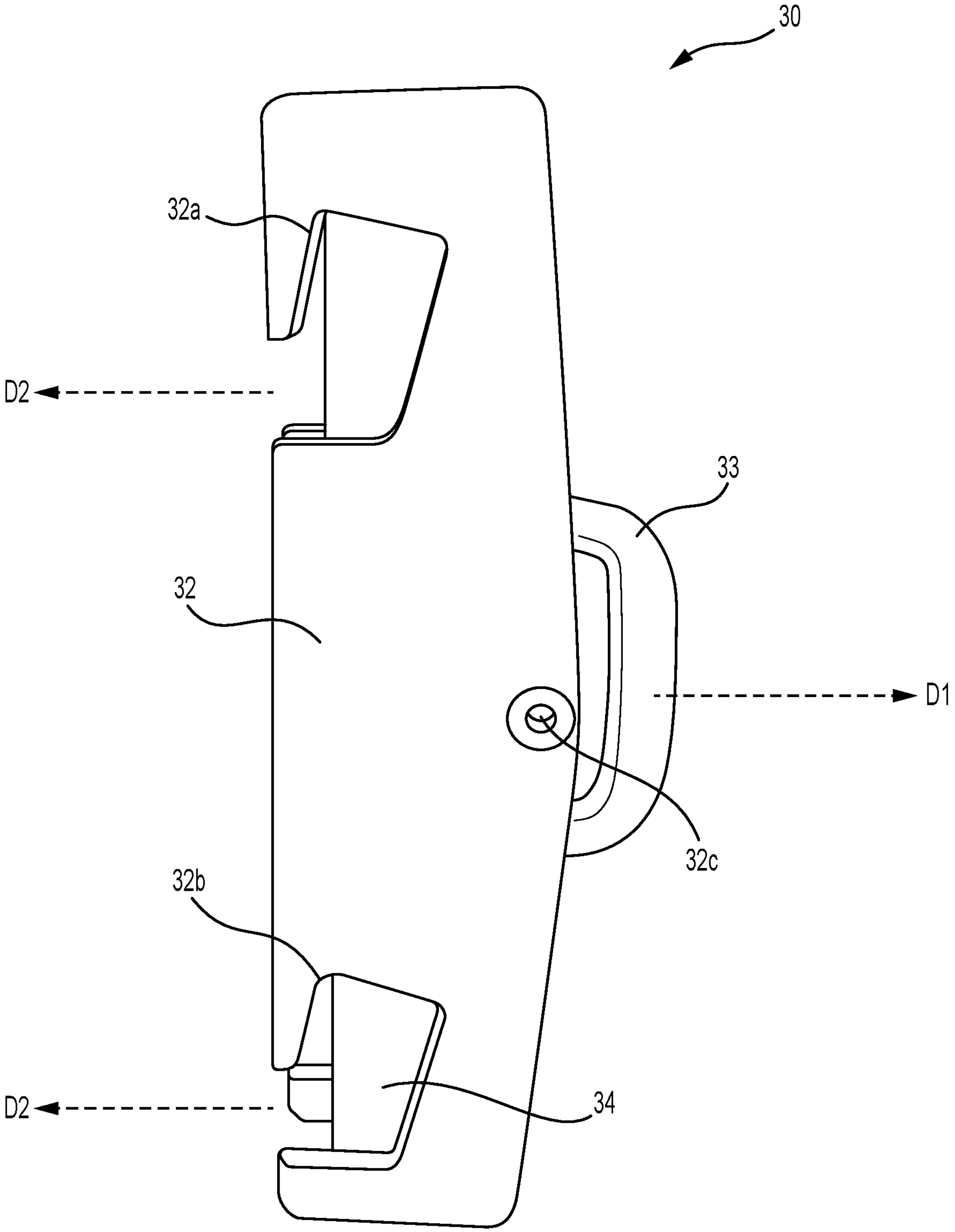
FIG. 3B is a left side view of a rung attachment member of a ladder caddy system.
Figure 3C:
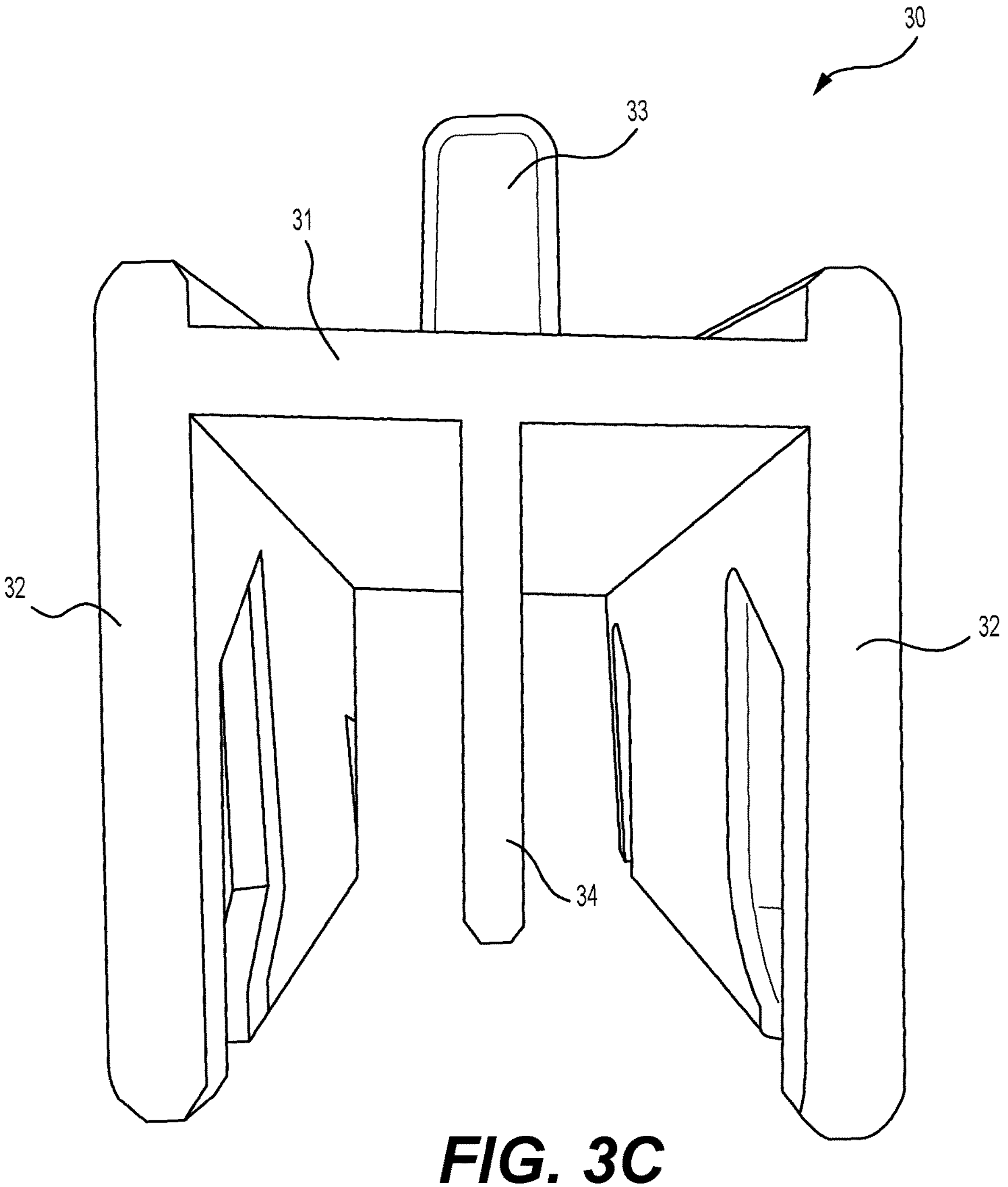
FIG. 3C is a top view of a rung attachment member of a ladder caddy system.
Figure 3D:
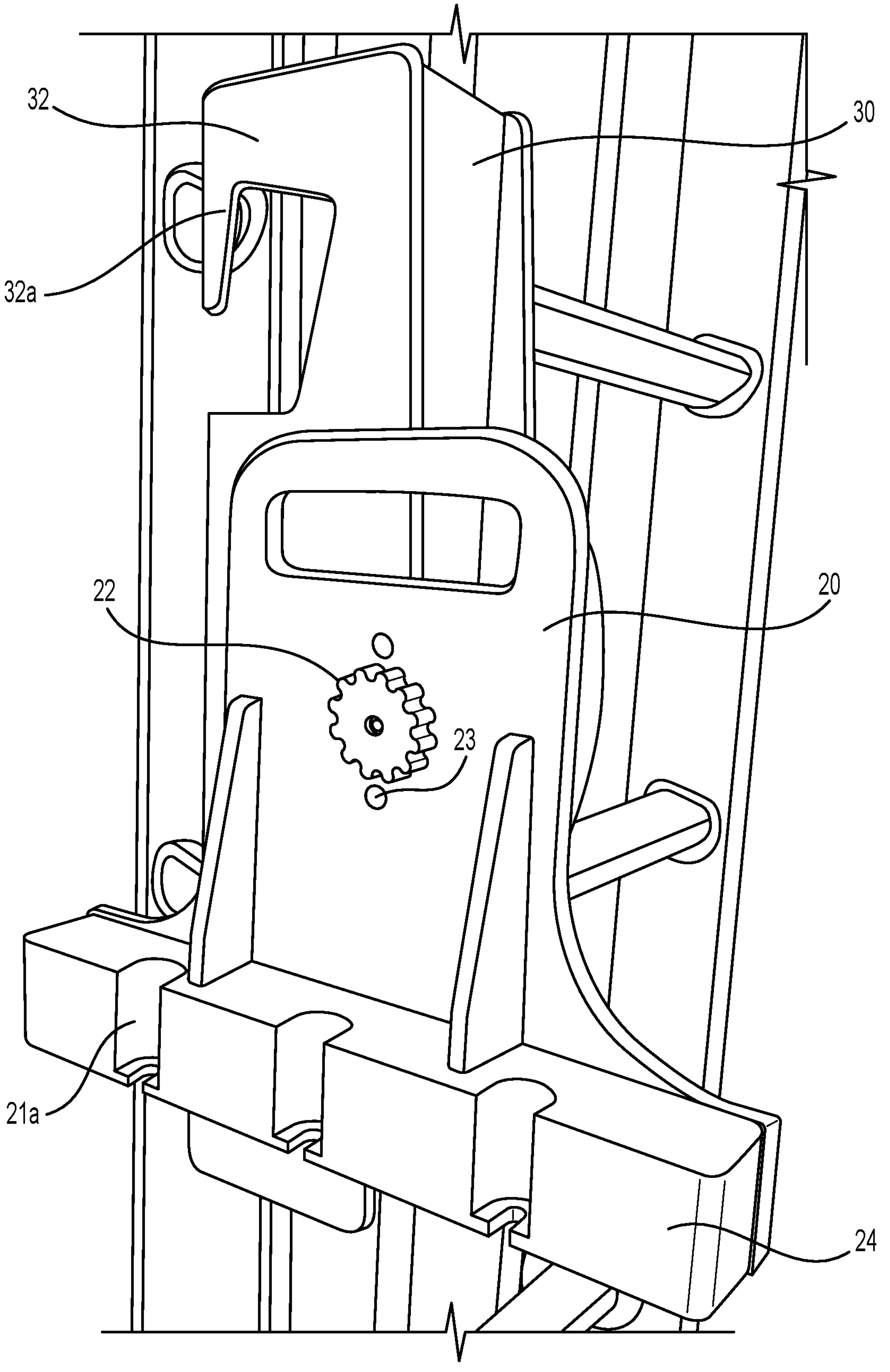
FIG. 3D is an environmental perspective view of a rung attachment member and support arm of a ladder caddy system.

Referring to FIGS. 3A-D, in a non-limiting embodiment, the rung attachment member 30 may include a pair of side plates 32, each side plate 32 including a first hook **32*a* and second hook 32*b* formed therein. An attachment hole 32*c* may be provided in both the side plates 32 for insertion of a pin 22 joining a side plate 32 together with the support arm 20 of FIG. 1. With reference to FIG. 3C, rung attachment member 30 may include a top plate 31 and a pair of side plates 32 positioned orthogonally to the top plate 31. A divider plate 34 may extend from top plate 31 between side plates 32. Advantageously, the design of rung attachment member 30 including dual side plates 32 with first and second hooks 32*a*, 32*b* formed therein allows for attachment on either a left or right siderail of a ladder by the inclusion of dual side plates each having hooks included therein, allowing both left-handed or right-handed workers to position the ladder caddy system in proximity to a dominant hand while performing tasks on the ladder. While the example of FIGS. 3A-C shows two hooks formed in the side plates of the rung attachment member, alternative hook arrangements may be provided, such as a single hook or multiple hooks. FIGS. 6**A-E described later in the disclosure, illustrate other example hook arrangements as may be provided in a rung attachment member using a single or double side plate configuration.

Continuing with FIGS. 3A-D, rung attachment member 30 may include a handle 33 extending in a first direction D1 from the top plate 31. Handle 33 may be removably attached to top plate 31. Alternatively, handle 33 may be integrally formed with rung attachment member 30, such as by injection molding or other manufacturing process. The first hook **32*a* and second hook 32*b* formed in the side plates 32 may open in a second direction D2 opposite the first direction D1 of the handle. The shape and positioning of the hook openings in relation to the handle provides for direct, fast, and easy placement of the rung attachment member 30** onto the rungs of a ladder during use.

Figure 4A:
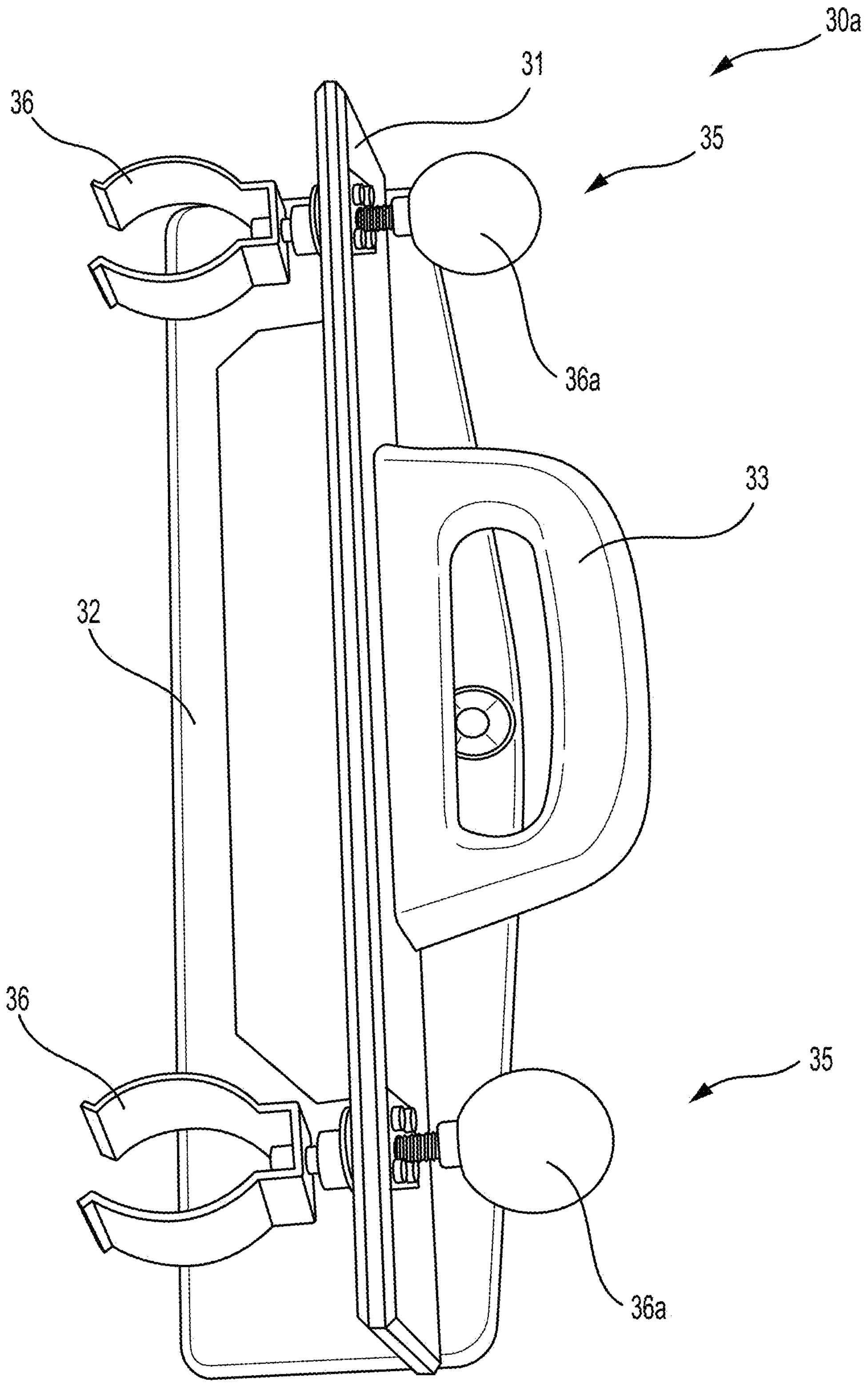
FIG. 4A is a side perspective view of a rung attachment member with spring clips.
Figure 4B:
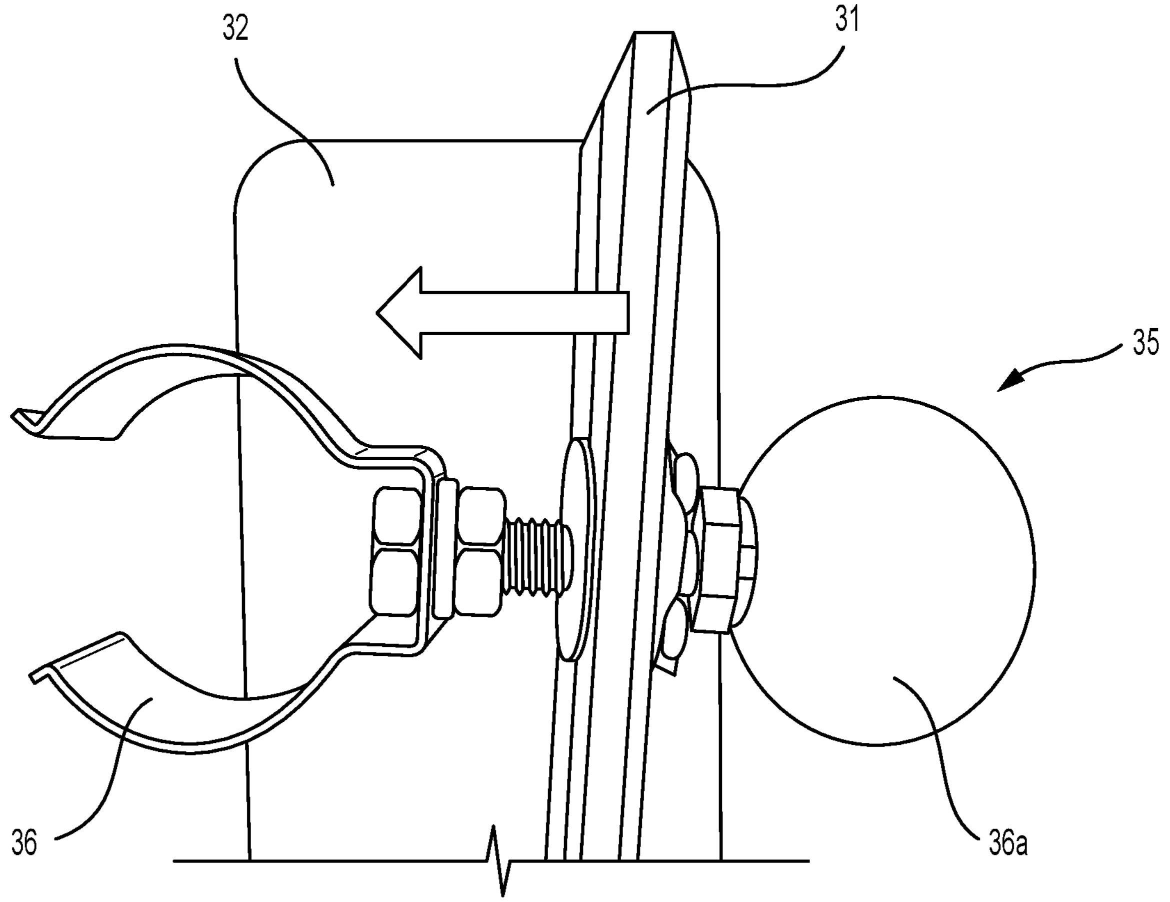
FIG. 4B is a side view of a spring clip of a rung attachment member in an extended position.
Figure 4C:
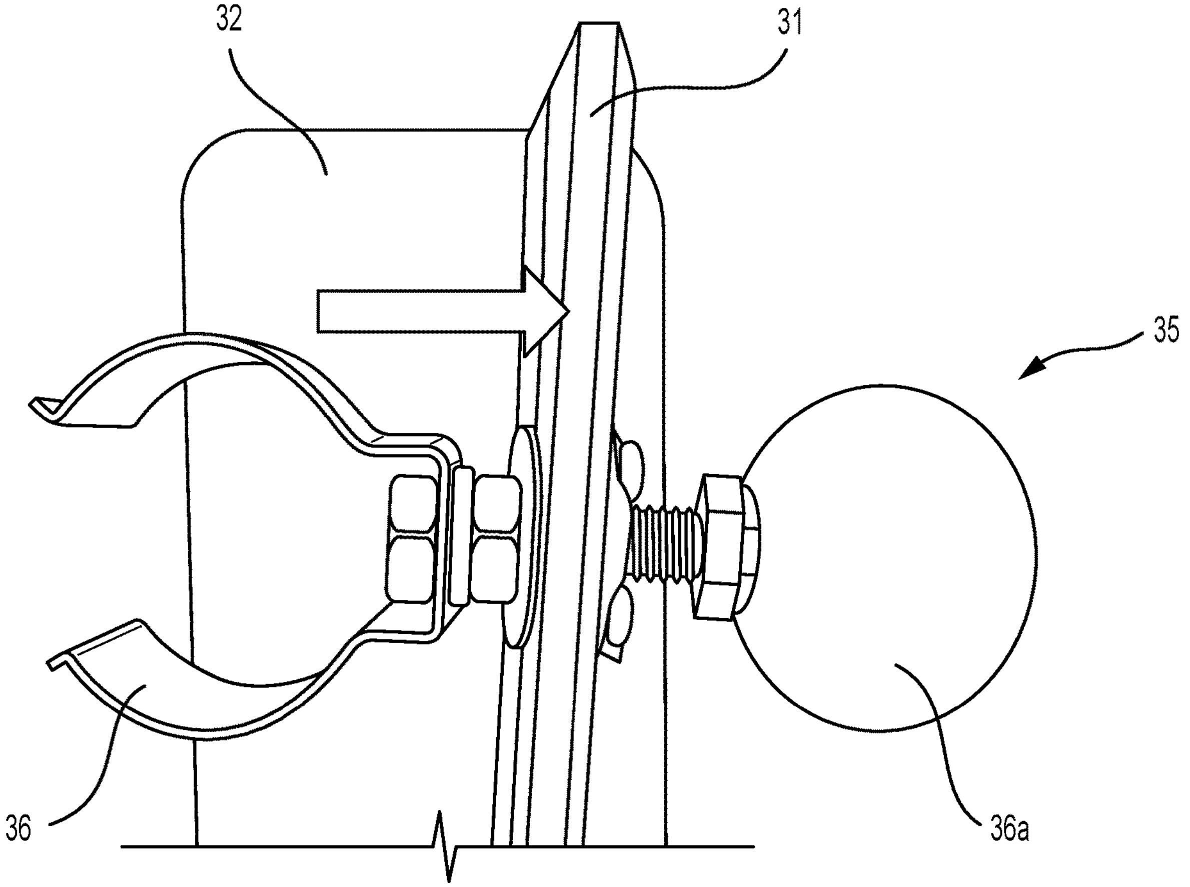
FIG. 4C is a side view of a spring clip of a rung attachment member in a retracted position.

Turning to FIGS. 4A-4C, an embodiment of the rung attachment member **30*a* is shown including a top plate 31, a side plate 32 positioned orthogonally to the top plate 31, and at least one interchangeable rung coupler 35 extending from the top plate 31. A first interchangeable rung coupler 35 and second interchangeable rung coupler 35 are shown in the example of FIGS. 4A-C as spring clips 36 having knobs 36*a* for rotatably adjusting the distance of the spring clips 36 further from top plate 31. FIG. 4B shows spring clips 36 in an extended position while FIG. 4C shows spring clips 36 after rotation of knob 36*a* to a retracted position proximate to top plate 31. The adjustability of spring clips 36 is particularly useful when fitting rung attachment member 30*a* onto ladders of different siderail thickness, such as may be found in aluminum ladders compared to fiberglass ladders. A further advantage of the design of FIGS. 4A-C in which spring clips 36 are used is the ability to place rung attachment member 30*a* on either a left or right siderail of a ladder by rotating the rung attachment member 30***a* such that sidewall 32 is positioned laterally outward from the siderail of the ladder.

Figure 5A:
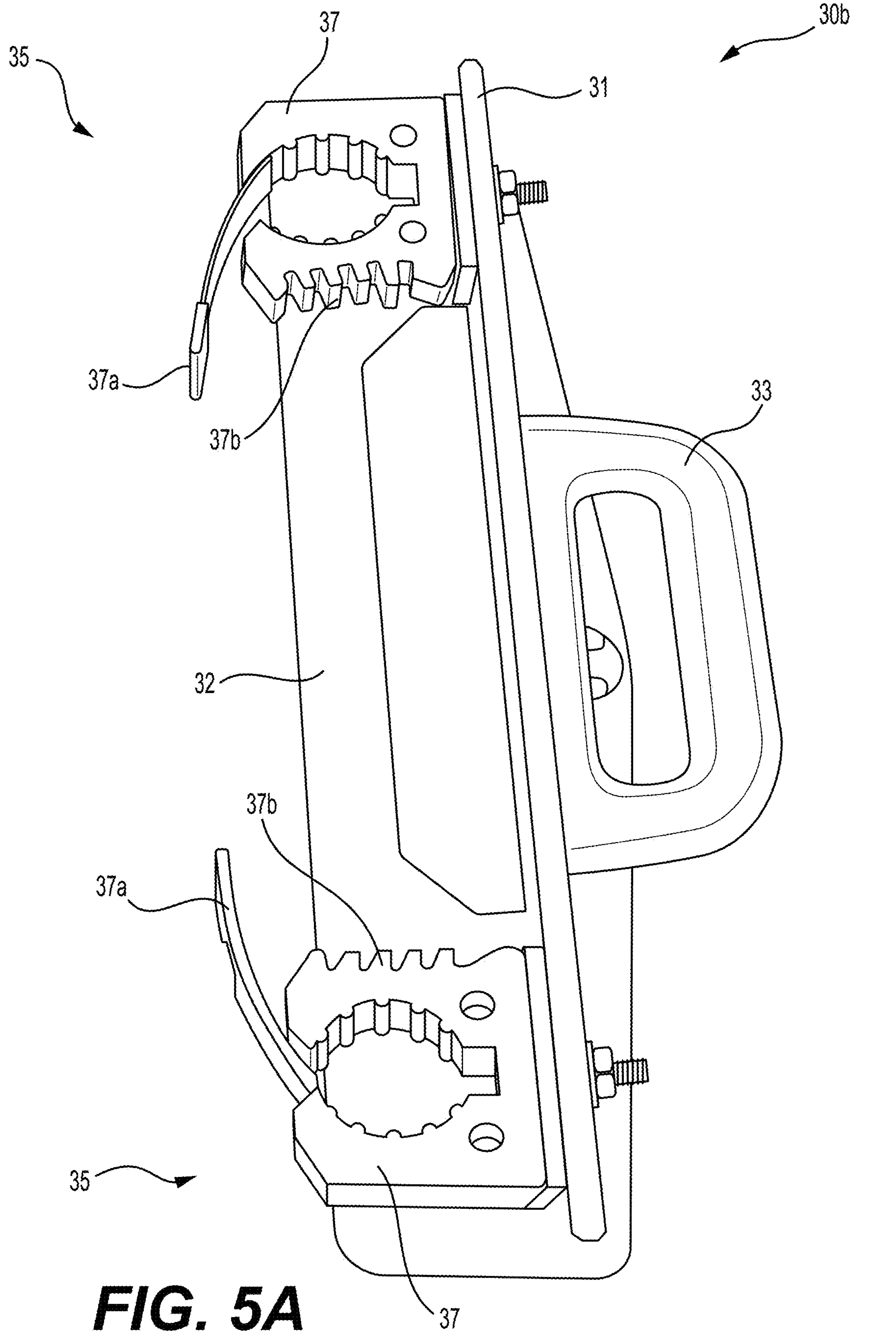
FIG. 5A is a side view of a rung attachment member with elastic clamps.
Figure 5B:
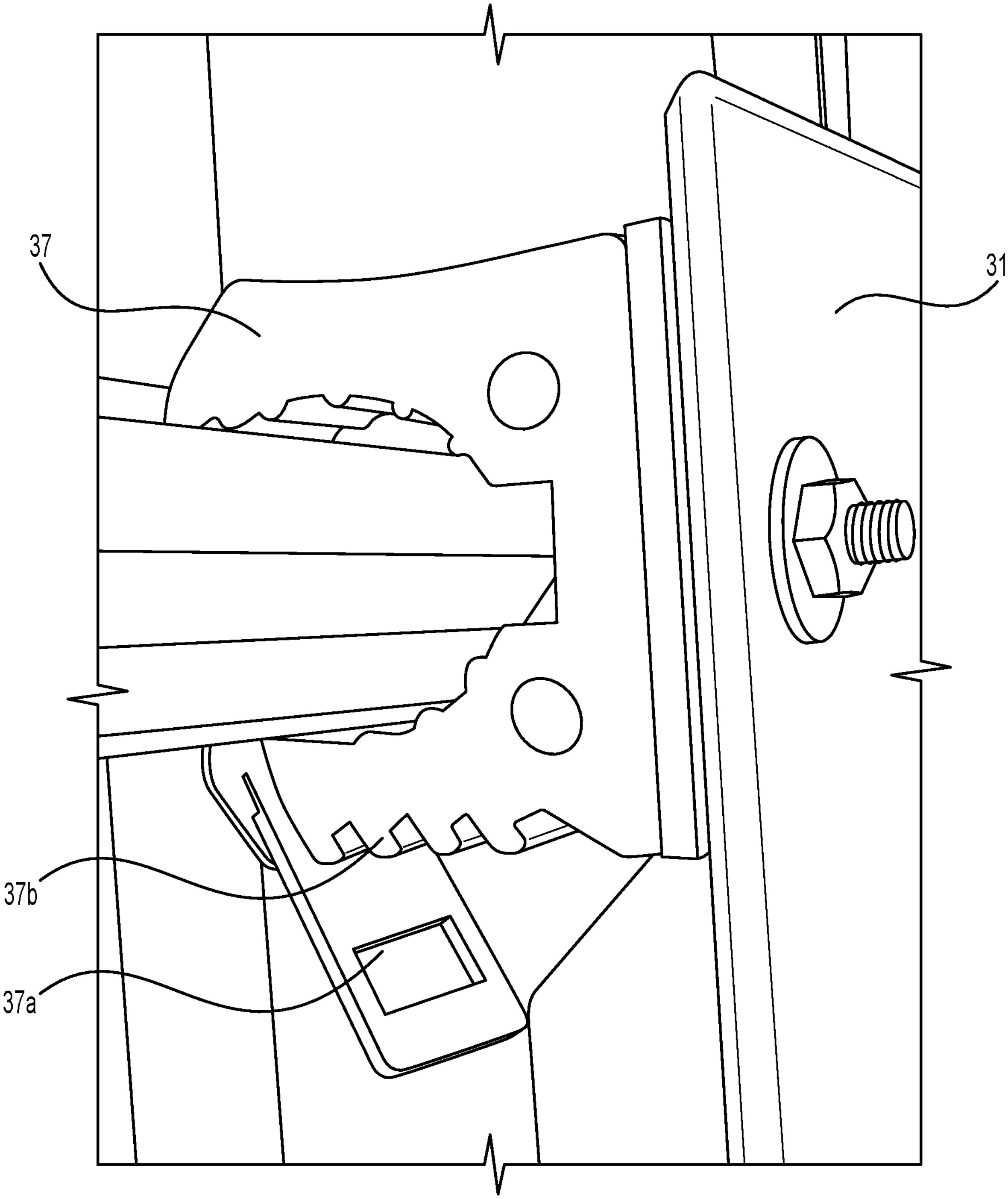
FIG. 5B is an environmental perspective view of an elastic clamp of a rung attachment member.

Turning to FIG. 5A, 5B, an embodiment of rung attachment member 30*b* includes at least one interchangeable rung coupler 35 formed by elastic clamps 37. As in the previous design, rung attachment member [30] 30*b* of FIGS. 5A-B may be placed on either a left or right siderail of a ladder by placing sidewall 32 laterally outward from the siderail of the ladder. In a non-limiting embodiment, elastic clamps 37 include flexible securement straps 37*a* and flexible adjustment notches 37*b*. Other types of elastic clamps may be provided, for example clamps including a single notch in which the flexibility of the strap accommodates different sized rungs. Alternatively, a plurality of notches may be included in the securement strap for securing the clamp in different positions on a coupled single notch.

The advantage provided by the elastic clamps is the adaptability provided by the clamps to grasp ladder rungs of varied shapes and sizes. In a non-limiting example, elastic clamps 37 are formed of rubber. However, any suitable elastic and flexible material may be used for elastic clamps 37 provided the material can support the weight of the combined caddy system including the rung attachment member, support arm, and supply holder.

Figure 6A:
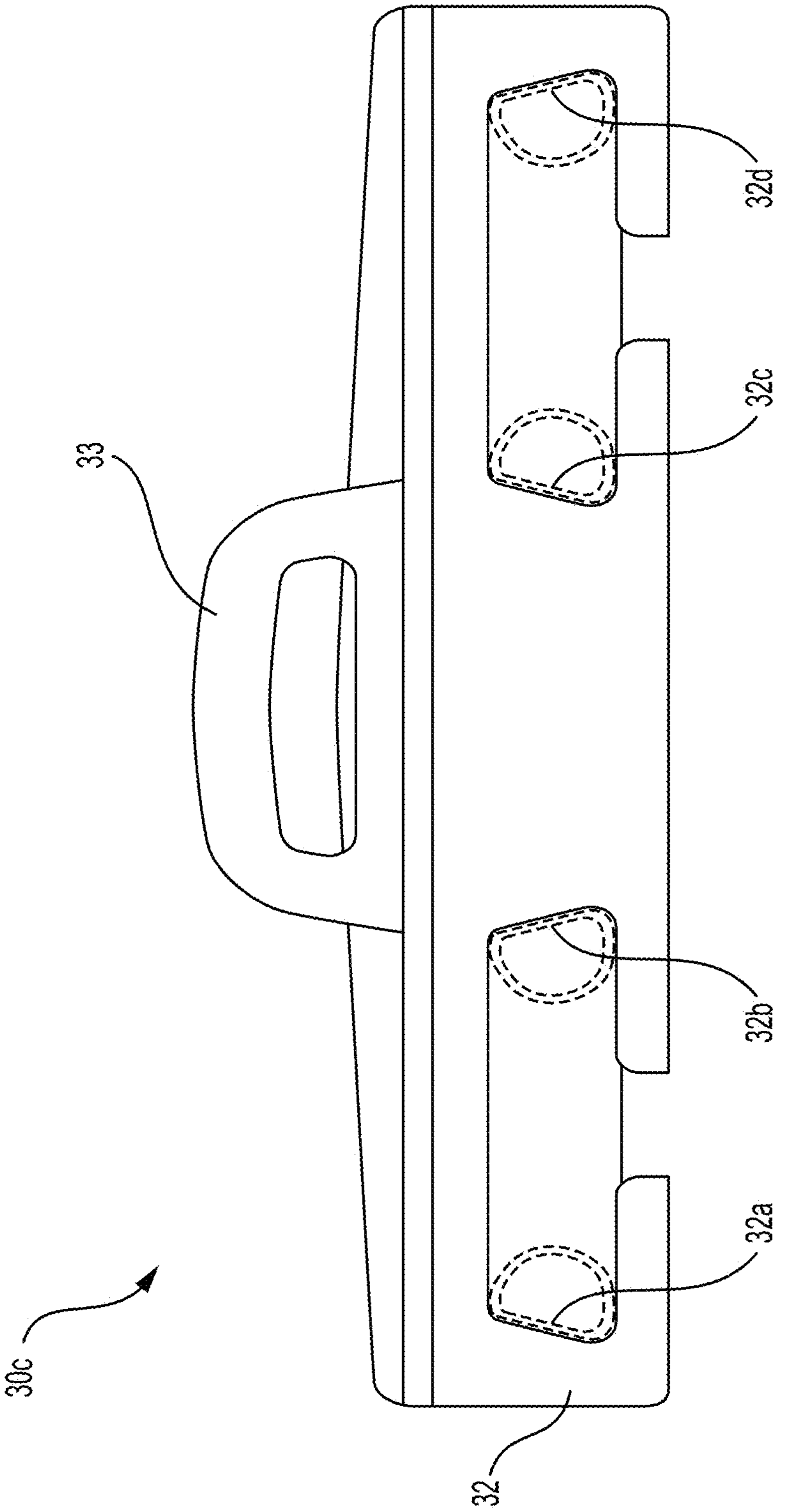
FIG. 6A is a side view of a rung attachment member formed with four hooks and two openings in a common plane.
Figure 6B:
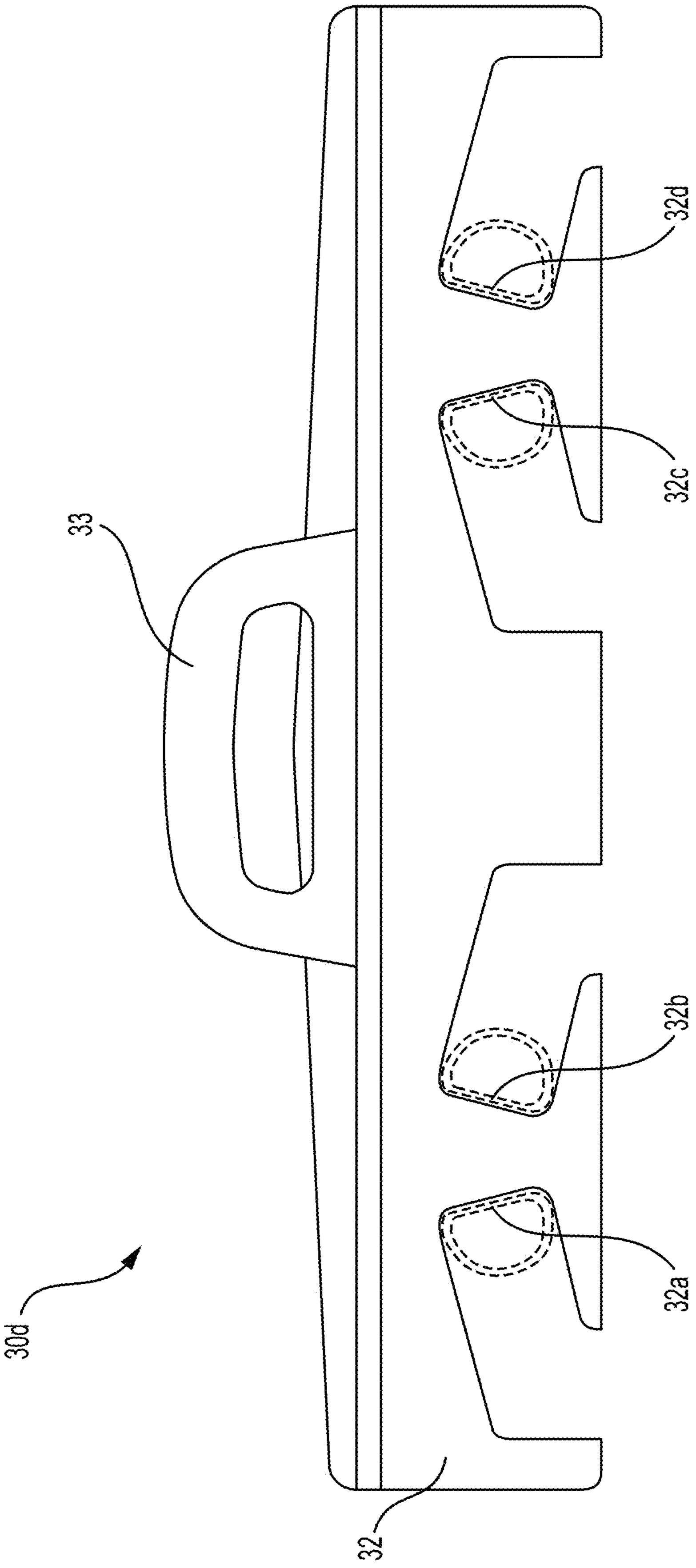
FIG. 6B is a side view of a rung attachment member formed with four hooks and four openings in a common plane.
Figure 6C:
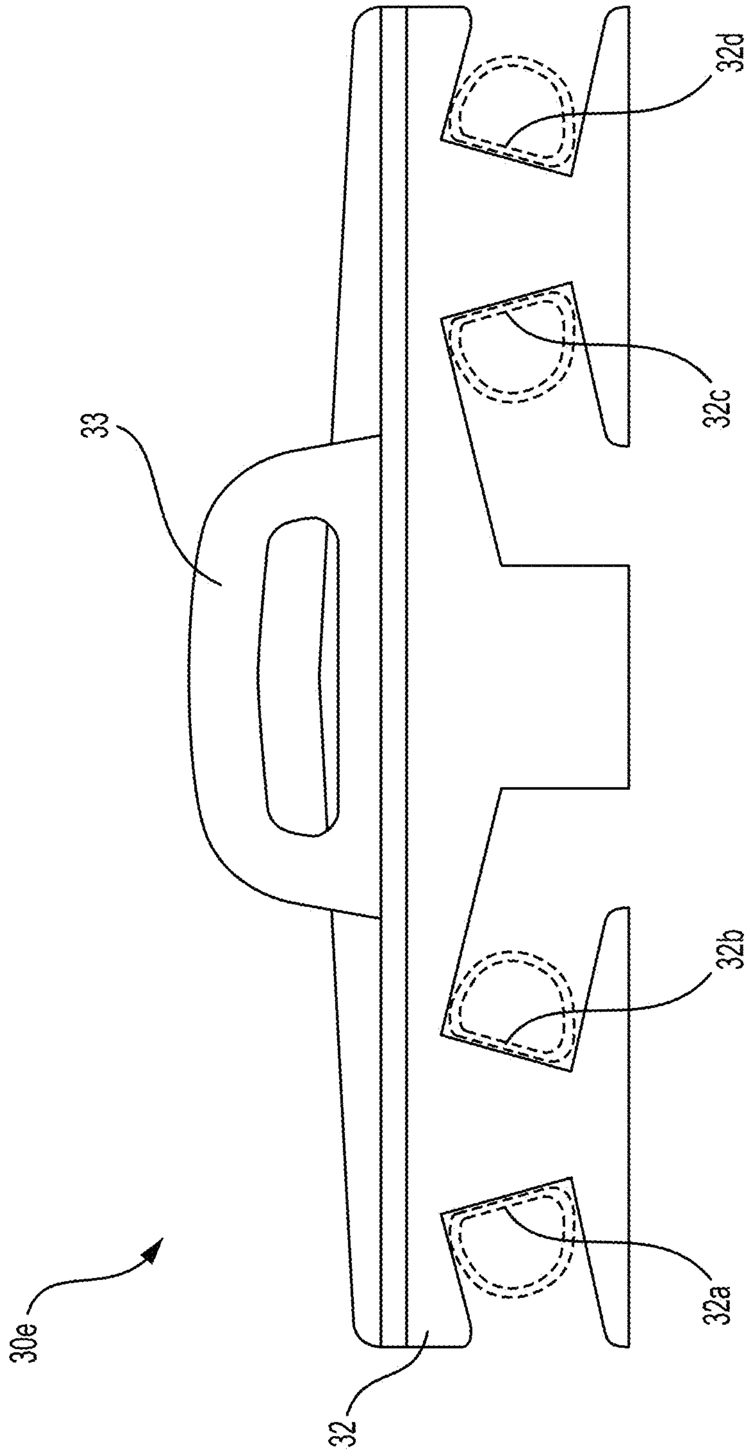
FIG. 6C is a side view of a rung attachment member formed with four hooks and two openings in a common plane, as well as an upper opening and a lower opening in parallel planes.
Figure 6D:
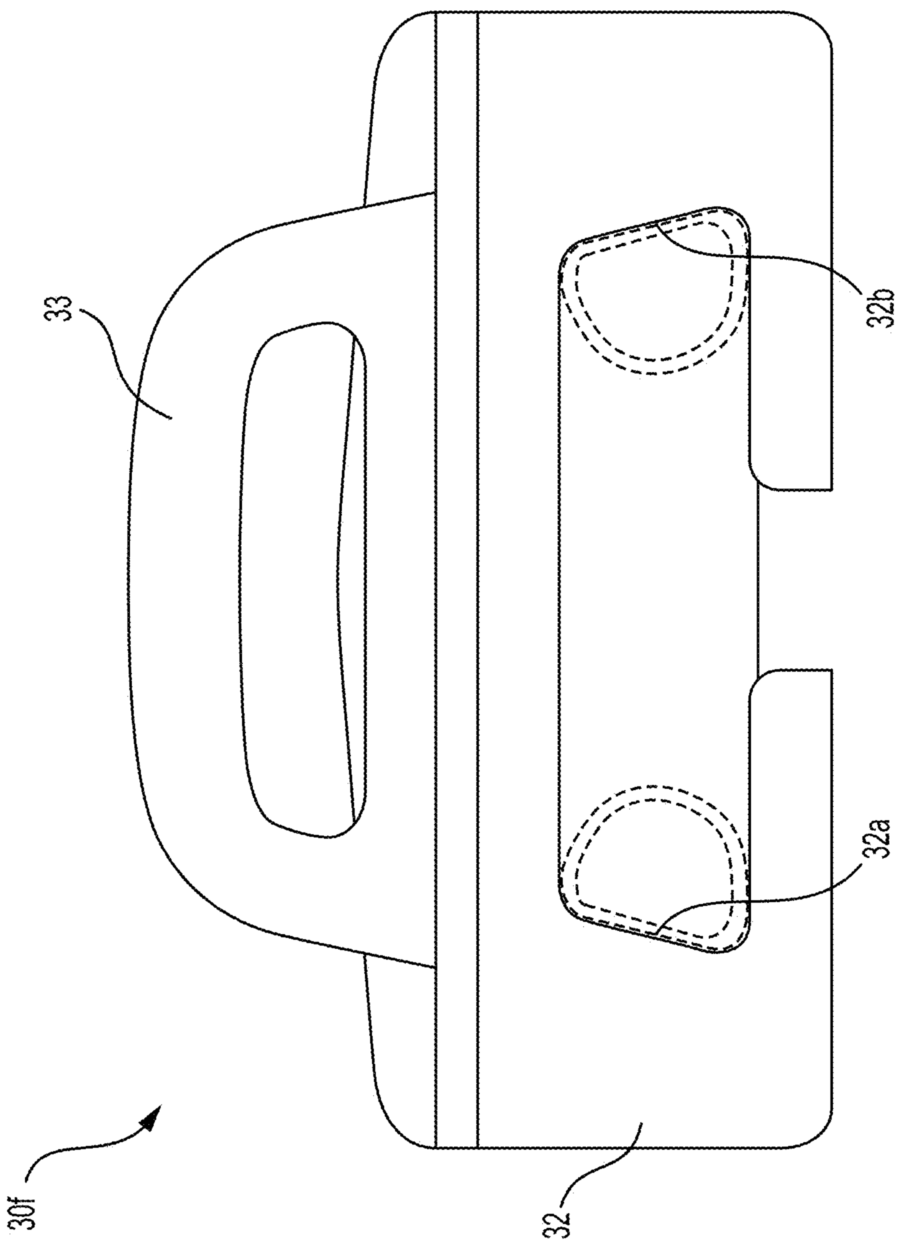
FIG. 6D is a side view of a rung attachment member formed with two hooks and a single opening.
Figure 6E:
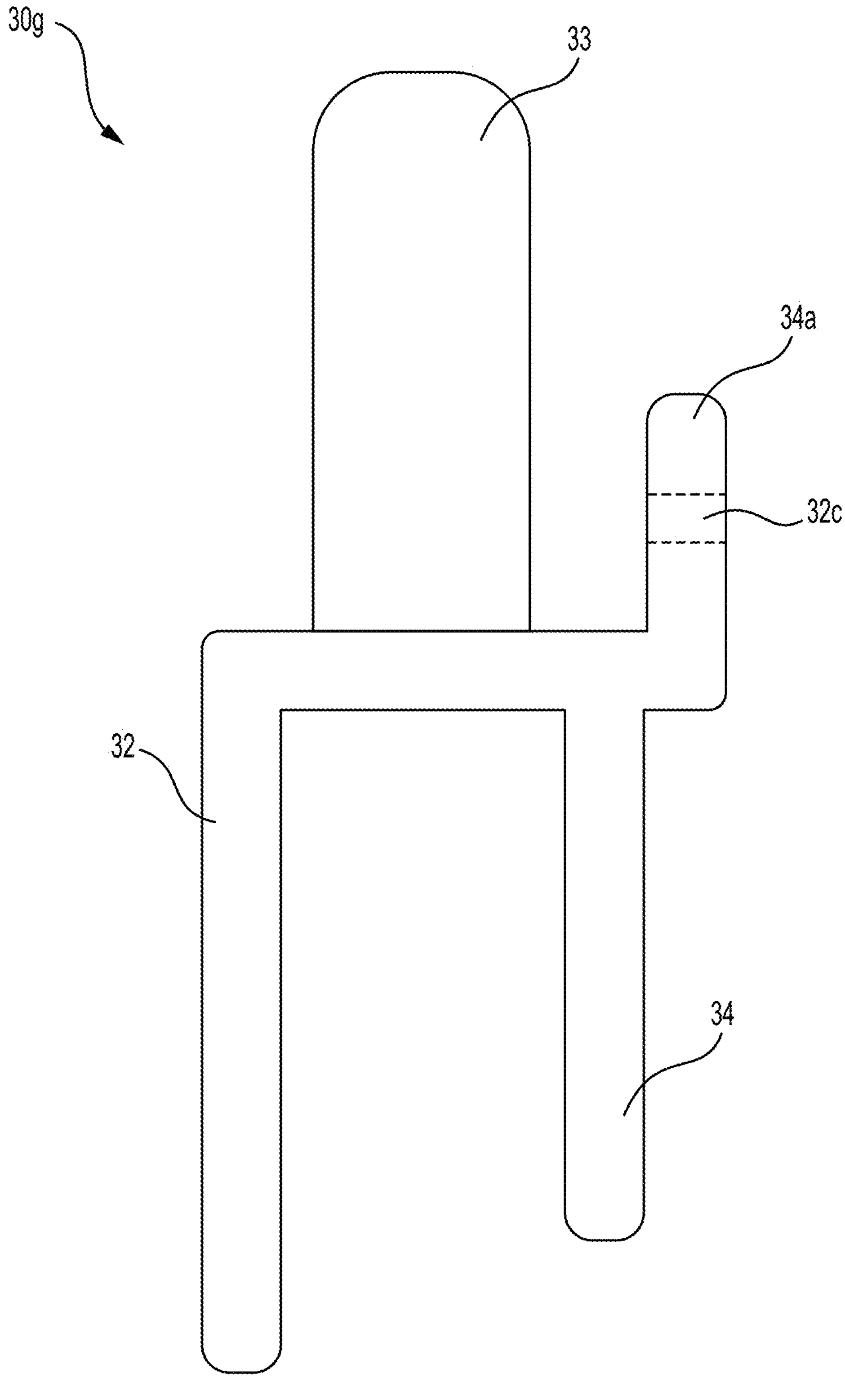
FIG. 6E is a top view of a rung attachment member with hooks formed in a single side plate.

Turning to FIGS. 6A-E, alternative embodiments of rung attachment member 30 are shown with various hook designs. FIG. 6A is a side view of a rung attachment member 30*c* formed with four hooks 32*a-d* and two openings sharing a common plane in a bottom edge of side plate 32. FIG. 6B is a side view of rung attachment member 30*d* formed with four hooks 32*a-d* and four openings sharing a common plane in a bottom edge of side plate 32. FIG. 6C is a side view of rung attachment member 30*e* formed with four hooks 32*a-d* having two openings for hooks 32*b*, 32*c* sharing a common plane in a bottom edge of sidewall 32. Hooks 32*a* and 32*d* have openings in parallel planes respectively along the side edges of sidewall 32. FIG. 6D is a side view of rung attachment member 30*f* formed with two hooks 32*a-b* and a single opening in a bottom edge of sidewall 32. FIG. 6E is a front view of a rung attachment member 30*g* with a single side plate 32 in which hooks are formed. Plate 34 is uniform and provides stability in gripping the ladder side rail. A flange 34*a* is provided with attachment hole 32*c* formed therein for attachment of the support arm. Flange 34*a* may be positioned laterally outward from the plane of plate 34 such that the support arm may be positioned on extendable ladders in both the extended position as well as the retracted position, the retracted position requiring a wider lateral clearance of the ladder siderails.

It is to be understood that the tool caddy system for ladders is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A tool caddy system for ladders comprising:

a rung attachment member, wherein the rung attachment member is configured for removable coupling to one or more rungs of a ladder and includes an attachment hole;

a support arm, including an elongated planar body having a plurality of vertically spaced holes extending along a longitudinal axis of the planar body and corresponding to alternate vertical positions for joining the support arm to the rung attachment member, an upper end of the planar body having a handle, and a lower end of the planar body having a flange with a mating interface formed therein;

an attachment pin;

wherein the support arm is pivotally and vertically adjustably connected to the rung attachment member by aligning a selected one of the plurality of vertically spaced holes in the support arm with the attachment hole of the rung attachment member and inserting the attachment pin therethrough;

wherein a vertical position of the support arm is configured to be adjusted by selecting an alternate one of the plurality of vertically spaced holes to insert the attachment pin; and a supply holder, wherein the supply holder includes a corresponding mating interface for interchangeable attachment to a corresponding the mating interface in the flange of the support arm.

2. The tool caddy system for ladders as recited in claim 1, wherein the rung attachment member comprises a top plate and a side plate positioned orthogonally to the top plate, the side plate including one or more hooks formed therein.

3. The tool caddy system for ladders as recited in claim 2, wherein the one or more hooks of the side plate comprise two hooks formed therein.

4. The tool caddy system for ladders as recited in claim 3, wherein the side plate of the rung attachment member includes four hooks formed therein.

5. The tool caddy system for ladders as recited in claim 1, wherein the rung attachment member comprises a top plate and a pair of side plates positioned orthogonally to the top plate, each side plate including one or more hooks formed therein.

6. The tool caddy system for ladders as recited in claim 5, wherein the one or more hooks formed in each side plate includes a pair of hooks formed in each side plate.

7. The tool caddy system for ladders as recited in claim 5, wherein the rung attachment member includes a divider plate extending from the top plate between the pair of side plates, wherein the divider plate is located centrally and substantially equidistantly between the pair of side plates.

8. The tool caddy system for ladders as recited in claim 1, wherein the rung attachment member comprises a top plate, a side plate positioned orthogonally to the top plate, and one or more interchangeable rung couplers extending from the top plate.

9. The tool caddy system for ladders as recited in claim 8, wherein the one or more interchangeable rung couplers are adjustable to different lengths extending from the top plate.

10. The tool caddy system for ladders as recited in claim 8, wherein the one or more interchangeable rung couplers comprises two or more interchangeable rung couplers extending from the top plate.

11. The tool caddy system for ladders as recited in claim 8, wherein the one or more interchangeable rung couplers is a spring clip.

12. The tool caddy system for ladders as recited in claim 8, wherein the one or more interchangeable rung couplers is an elastic clamp.

13. The tool caddy system for ladders as recited in claim 1, wherein the rung attachment member includes a handle extending from the top plate.

14. The tool caddy system for ladders as recited in claim 13, wherein the handle is integrally formed with the rung attachment member.

15. The tool caddy system for ladders as recited in claim 1, wherein the mating interface includes a female slot and the corresponding mating interface includes a corresponding male connector.

16. The tool caddy system for ladders as recited in claim 15, further comprising a pin, wherein the female slot and the corresponding male connector each include a hole in which the pin is inserted.

* * * * *